Aug. 16, 1932.　　　G. E. CHATILLON　　　1,871,776
DEVICE FOR DETERMINING THE RESISTANCE OF BODIES TO DEFLECTION
Filed Dec. 30, 1929　　3 Sheets-Sheet 1
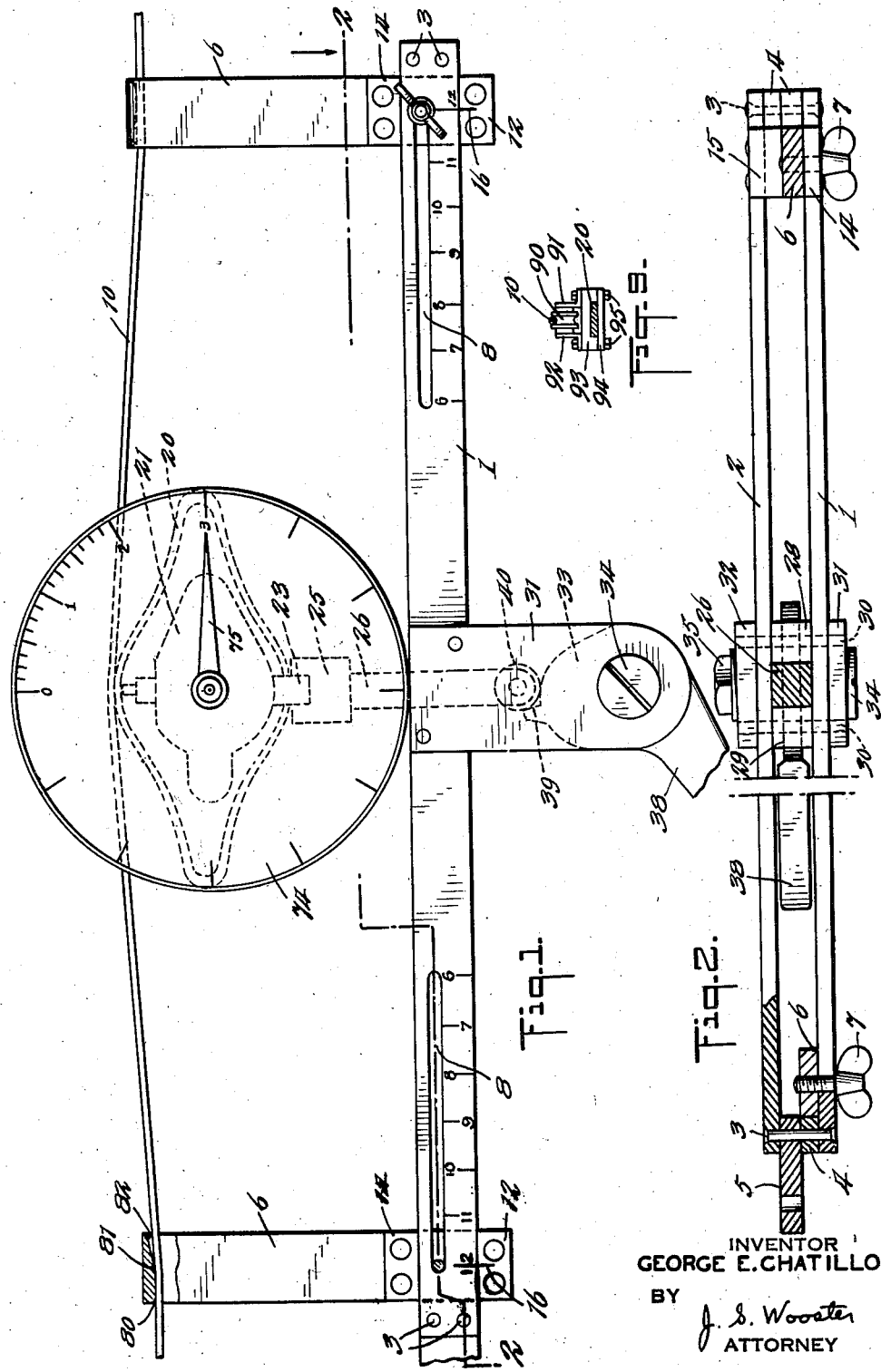
INVENTOR
GEORGE E. CHATILLON
BY
J. S. Wooster
ATTORNEY Aug. 16, 1932.   G. E. CHATILLON   1,871,776
DEVICE FOR DETERMINING THE RESISTANCE OF BODIES TO DEFLECTION
Filed Dec. 30, 1929   3 Sheets-Sheet 2
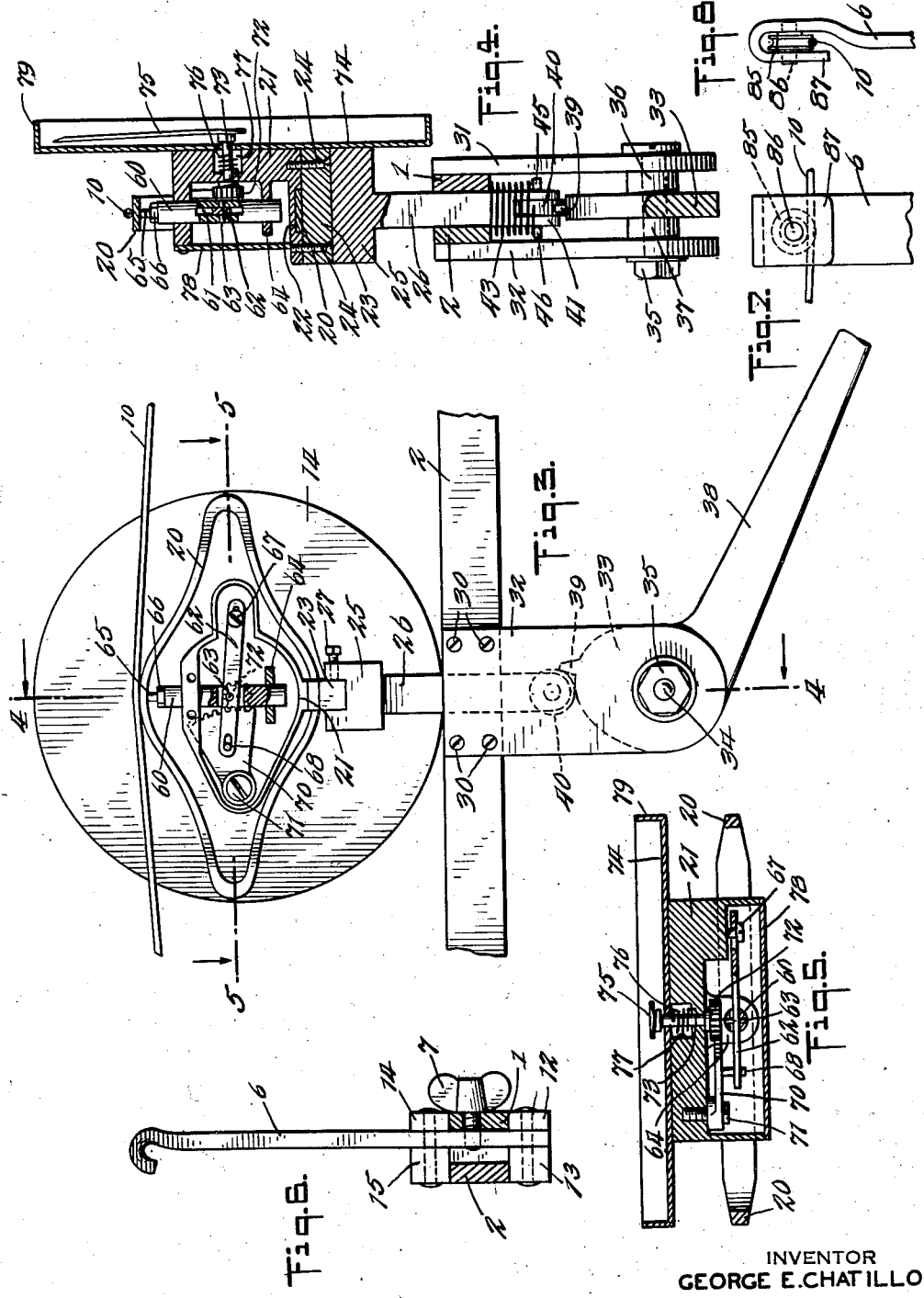
INVENTOR
GEORGE E. CHATILLON
BY
J. S. Wooster
ATTORNEY

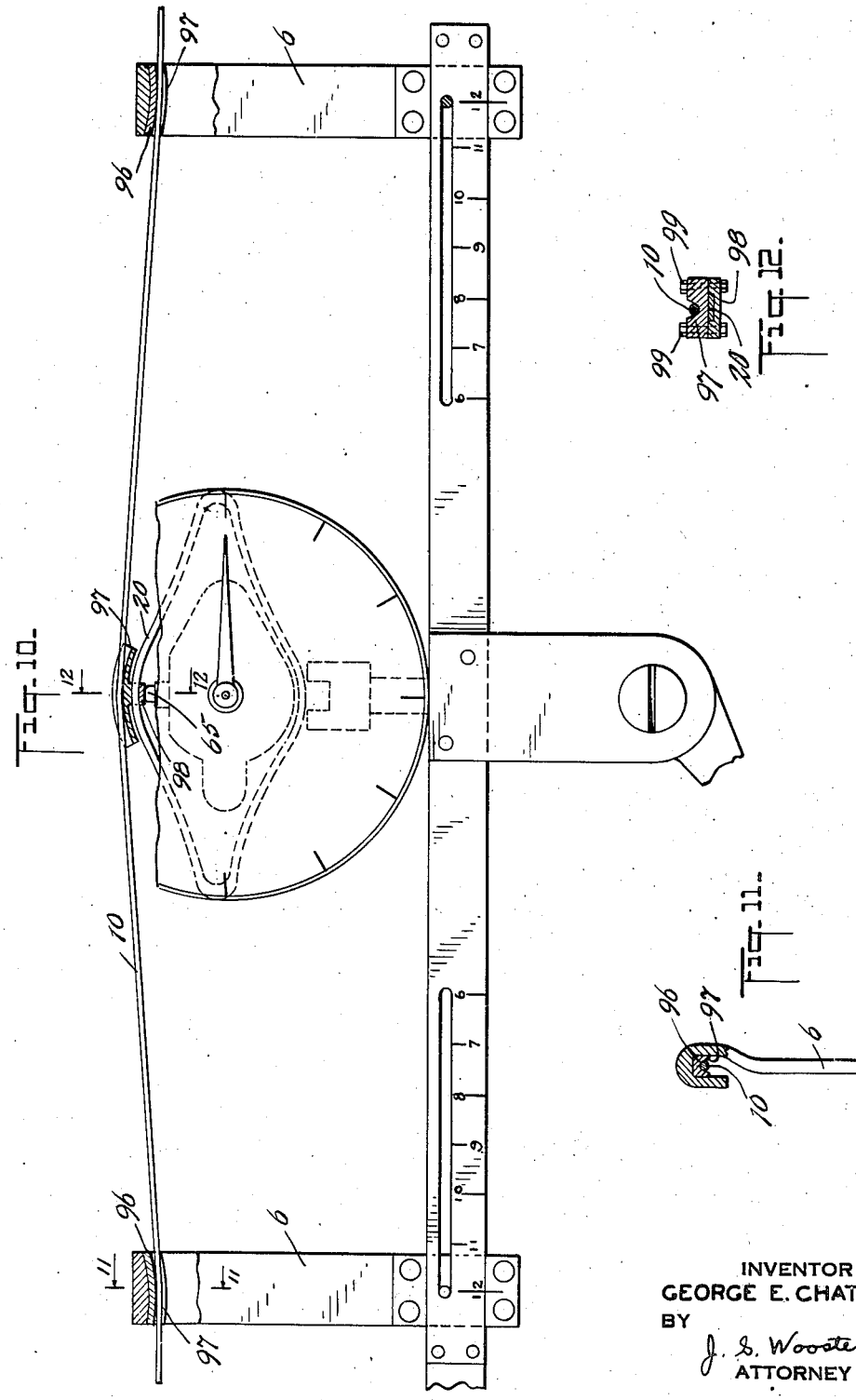

Patented Aug. 16, 1932

1,871,776

UNITED STATES PATENT OFFICE

GEORGE E. CHATILLON, OF NEW YORK, N. Y., ASSIGNOR TO JOHN CHATILLON & SONS, OF NEW YORK, N. Y., A CORPORATION OF NEW YORK

DEVICE FOR DETERMINING THE RESISTANCE OF BODIES TO DEFLECTION

Application filed December 30, 1929. Serial No. 417,297.

This invention relates to improvements in devices for determining the resistance to deflection of bodies.

It is an object of my invention to provide a simple and accurate device for determining the resistance to deflection of all bodies having some rigidity whether anchored at their ends or not, such as metal rods, glass rods, wooden beams, shafts of golf sticks, wires, and the like, or, if desired, for determining the deflecting force required to break said bodies.

A further object of my invention is to provide a device for determining the resistance to deflection and, as a result, the tension, of a span of wire, cable, rope or any flexible member, hereinafter to be referred to as wire, between two points, without interrupting the continuity of the wire. This is accomplished by causing a length of the wire under tension to be deflected from its normal position, and then ascertaining the force necessary to hold the wire thus deflected, said force being a function of the tension of the wire.

A further object of my invention is to provide a device by which the length of the deflected portion of the wire can be varied, thus adapting the device for use in testing wires under more widely differing tensions than would otherwise be possible.

A further object of my invention is to provide a device by which the wire can be deflected through the manipulation of a single lever, thereby greatly facilitating use of the device.

A further object of my invention is to provide a device in which the indicating mechanism is of simple and sturdy construction, yet capable of indicating with great sensitivity over a wide range the resistance to deflection of bodies.

A still further object of my invention is to provide a device which will reduce to a minimum friction between the wire being tested and parts of the device while the wire is being deflected.

Another object of my invention is to provide a device which can be used for testing extremely fine and soft copper wire without cutting or denting the wire or bending it at an acute angle.

The device according to this invention comprises a beam, a pair of members mounted on said beam adapted to engage a body to be tested, resilient deflecting means carried by said beam between said members and movable relatively thereto, means for applying force to said resilient means to deflect the body out of line, and means for indicating the force exerted on said resilient means to hold the body thus deflected.

In the preferred embodiment of the invention the body being tested is deflected by a substantially elliptical spring which engages it intermediately of the members at each end of the beam either directly or through an engaging member carried by the spring and the indicating means is controlled by the amount of compression of the spring caused by the resistance of the body to deflection.

Inasmuch as the compression of the spring, the force exerted on the spring, and the tension of a wire or resistance to deflection of a body are all functions of each other, the indicating means may be calibrated to give actual measurements of any of the three or it may be calibrated on a purely arbitrary scale.

Further objects of my invention will be apparent from the following description in connection with the accompanying drawings illustrating the invention.

Referring to the drawings:

Fig. 1 is a front elevation of a device embodying this invention particularly adapted for testing wires with part of one of the wire engaging members broken away.

Fig. 2 is a section along the line 2—2 of Fig. 1 in the direction of the arrow.

Fig. 3 is a rear elevation of the device shown in Fig. 1 with the rear plate of the casing member removed and parts of the framework broken away.

Fig. 4 is a section on the line 4—4 of Fig. 3, including the rear plate of the casing member.

Fig. 5 is a section on the line 5—5 of Fig. 3, also including the rear plate of the casing member.

Fig. 6 is a side elevation of one of the wire engaging hook members

Fig. 7 is a front elevation of a modified form of wire engaging member.

Fig. 8 is a side elevation of the wire engaging member shown in Fig. 7.

Fig. 9 is a side elevation of a wire engaging member mounted on the elliptical spring shown in Fig. 1, the spring being shown in section.

Fig. 10 is a front elevation of the device shown in Fig. 1 with modified wire engaging members shown in section.

Fig. 11 is a side elevation of the upper part of one of the end wire engaging members shown, partly in section along the line 11—11 of Fig. 10.

Fig. 12 is a section on the line 12—12 of Fig. 10.

Referring more particularly to the drawings, the frame of the device consists of a beam formed by front and rear horizontal bars 1 and 2, respectively, secured at their ends by rivets 3 with spacers 4 and 5 interposed, and hook members 6 mounted on bar 1 for lateral adjustment by means of winged screws 7 passing through longitudinal slots 8 at each end of bar 1 into threaded openings in the members 6. The spacer 5 extends laterally beyond the horizontal bars and is provided with a hole adapted to be engaged by a hook on the operator's belt to facilitate carrying the instrument up and down telegraph poles, towers, etc. The hook members 6 at the end remote from bar 1 are adapted to engage the wire being tested, designated by reference numeral 10 in the drawings.

The hook members are mounted for lateral adjustment on the bar 1 so that the distance between the points engaged by the hooks may be varied as found desirable when dealing with various types of wire or different tensions. Each hook member 6 has mounted at its lower end a block 12 on one side and a block 13 on the other. Blocks 14 and 15 are mounted on each member 6 similarly to blocks 12 and 13 but spaced above blocks 12 and 13 a distance slightly greater than the width of bars 1 and 2. These blocks cooperate with the bars 1 and 2 and facilitate the sliding of hook members 6 laterally and also insure that the members 6 will always be perpendicular to the horizontal bars 1 and 2. As shown in Fig. 6 blocks 13 and 15 are made of sufficient width to rest on rear horizontal bar 2. The longitudinal slots 8 which limit the lateral movement of the hook members are graduated to show the distance between these members in any particular position.

As shown in Fig. 1 the graduations represent inches although any linear unit may be used. If it is desired to have the span of wire to be deflected measure six inches, each hook member is moved along its slot until the line 16 on its block 12 registers with the "6" graduation on its slot. To measure seven, eight, etc. inches the lines 16 on the block 12 of the hook members are brought opposite graduation "7", "8", or "9" etc. in their respective slots.

The means for deflecting the length of wire between the two hook members and for measuring the force required to deflect the wire comprises a substantially elliptical spring 20 held between the housing member 21, which is provided with a groove 22 into which the spring 20 fits, and the block 23. The block 23 and housing member 21 are held together by means of screws 24 passing through the block 23 into the housing member. This block 23 fits into a groove in the head 25 of plunger 26 and is held in position by set screws 27 only one of which is shown (see Fig. 3). The plunger 26 passes through a bearing intermediate the ends of bars 1 and 2 and formed by the sides of bars 1 and 2 and blocks 28 and 29 interposed between bars 1 and 2 and spaced apart a distance slightly greater than the width of the plunger. The blocks 28 and 29 are held in place by rivets 30 passing through bars 1 and 2, said rivets also securing the dependent brackets 31 and 32 to the bars 1 and 2, respectively. To deflect the wire being tested, vertical movement is given to the plunger 26 by means of a cam 33 pivotally mounted on a bolt 34 passing through brackets 31 and 32 and fixed with relation to these brackets by a nut 35. The cam 33 is centered on the bolt 34 by spacers 36 and 37. A lever 38 is provided to actuate the cam 33 which is also provided with an abutment 39 to limit its movement. The cam engages a roller 40 pivotally mounted in the bifurcated end 41 of plunger 26.

When the instrument is not in use the lever 38 will be swung up against the right hand end of horizontal bar 1, as viewed in Fig. 1, the cam in this position permitting plunger 26 to come to its lowest position. When testing a wire, the lever will be moved around to the position shown in the drawings forcing the abutment 39 against the roller 40. The abutment is positioned on the cam just to the right (looking at Fig. 3), of the point of greatest eccentricity of the cam so that there will be no tendency for the cam to turn when the instrument is under tension and readings being made. To make the roller 40 follow the periphery of the cam 33 at all times, a helical spring 43 is disposed on plunger 26, abutting against bars 1 and 2 and blocks 28 and 29, forming the bearing for the plunger, at one end and against pins 45 and 46, carried by the lower end of plunger 26, at the other end. (See Fig. 4.)

To indicate the force exerted on spring 20 in holding the wire being tested deflected, a rod 60, having a slot 61, is pivotally mounted on the lever 62 passing through said slot 61 by means of the pin 63. This rod 60 is adapted for vertical movement only and is guided in its movement by being passed through an opening in the top of casing member 21 and through an opening in the shelf 64 made integral with casing member 21. The upper end of rod 60 has a threaded opening therein in which is screwed the stem 65, threaded at its lower end. A lock nut 66 is disposed on stem 65 to lock the stem in position. By means hereinafter to be described, the rod 60 is always urged upwardly, the stem 65 abutting against the spring 20. The lever 62 is pivoted at one end on the screw 67 secured in casing member 21 and at the other on the pin 68 carried by the gear segment 70 which is pivoted on the screw 71 secured in casing member 21. The teeth of gear segment 70 engage a pinion 72 fixed on one end of shaft 73 passing through and journaled in an opening in casing member 21 and an opening in the center of circular dial 74, carried by casing member 21. This shaft 73 carries pointer 75 at its opposite end. The dial 74 is preferably graduated to show the force exerted on spring 20 in arbitrary units but may be graduated to show this force in standard units or the tension of wire.

One advantage in calibrating the dial to show the force exerted on spring 20 is that the distance the hook members 6 are apart does not affect the calibration. When the actual tension of the wire is to be later calculated, the distance separating the hook members can then be considered.

If the dial is to be calibrated to give directly the actual tension of the wire, a different set of graduations will be required for different distances between hook members.

To urge the rod 60 against the spring 20 and to bring the pointer 75 back to the zero graduation on dial 74 a helical spring 76 is disposed on the shaft 73 between dial 74 and the rear wall of the chamber 77 formed in the casing member 21. One end of the spring 76 is anchored on the shaft 73 and the other in the rear wall of chamber 77. To protect the indicating mechanism a rear cover plate 78 is provided (see Figs. 4 and 5) and to protect the pointer 75 the dial 74 is turned over at its periphery to form the flange 79.

To measure the tension in a wire the hook members 6 are hooked over the wire while the lever 38 is swung all the way to the right looking at Fig. 1. The spring 20 is at its lowest position and the wire passes directly above it. The instrument thus being in position, the lever 38 is swung downwardly and to the left, looking at Fig. 1, until the abutment 39 engages the roller 40 and prevents further movement of the lever in that direction. The pointer will then indicate the force exerted on spring 20 in holding the wire deflected; if it is desired to change the tension, it is not necessary to touch the instrument; the wire is merely pulled up or let out until the pointer indicates the desired tension.

In making a measurement as above described, the operation of the instrument when the lever is swung to the left is as follows: Cam 33 is turned by the lever and forces the plunger 26 upwardly and, consequently, spring 20 which engages and deflects the wire. The tension of the wire resists deflection and compresses the spring 20, the compression of the spring being greater as the tension of the wire is increased. The compression of the spring forces rod 60 downwards and, consequently, the link 62 which, as it moves down, causes the gear segment 70 to turn in a clockwise direction (looking at Fig. 3), the teeth of said gear co-operating with the pinion 72 and thus causing shaft 73 and the pointer 74 to turn in a clockwise direction (looking at Fig. 1). The reading on the dial 75 is taken when the abutment 39 engages roller 40 and prevents further movement of lever 38 to the left (Fig. 1).

When the lever 38 is moved back to the left, spring 43 forces the plunger 26 and spring 20 down as far as the cam permits and spring 20, being relieved of pressure, assumes its normal position, thereby permitting helical spring 76 to turn back pointer 75 and move rod 60 upwardly until its stem 65 abuts against spring 20. The instrument is adjusted so that the pointer is at the zero graduation when the stem 65 abuts against spring 20 when said spring is in its normal position. This adjustment can be accurately made by regulating the distance stem 65 projects above rod 60.

In deflecting the wire under test it must be pulled through the hook members 6 to a limited extent. The amount of wire that must pass through the hook members is very small but the tension of the wire is so great that in cases where the wire is under great tension, precautions should be taken to reduce the friction between the wire and the hook members and also to prevent the hook members denting or cutting the wire where the wire is made of copper or other soft metals. To a lesser extent there is sliding contact between the wire and the spring 20, particularly where the length of wire between one point of support and one hook member greatly exceeds the length of wire between the other point of support and the other hook member, and therefore means for reducing friction between the spring and wire is also advantageous in these cases.

In Fig. 1 the left-hand hook member 6 has been broken away to show in section that part of the member which engages the wire 10. On one side it is rounded at 80 while it is sloped from the center 81 of the member to the opposite side 82 at an angle to the horizontal equal to the slope of a line drawn from the center 81 to the apex of spring 20 when that spring is under no compression and the plunger 26 is at its highest position. By this shaping of the hook member the wire is not bent by a sharp edge no matter how great or small the tension of the wire. This reduces the sliding friction of the wire and any tendency of the hook member to dent it.

A modified form of the hook member 6 is shown in Figs. 7 and 8 where a roller 85 is rotatably mounted on the shaft 86 journaled in the sides of the hooked portion of the member 6. By using a roller in this manner the friction between wire and hook member is practically completely eliminated. The roller is preferably mounted so that its periphery does not extend as far down as the doubled over portion 87 of member 6 so that if by accident the wire should jump off the roller, it will be held by the hooked portion of member 6 and thus prevent the device from falling.

In Fig. 9 a roller 90 mounted on spring 20 to engage the wire 10 is shown. The roller is journaled between brackets 91 and 92, mounted on block 93 recessed to fit over the spring 20 and held in position by means of the plate 94 on the lower side of spring 20 and bolts 95 passing through the brackets, block, and plate.

Figs. 10, 11 and 12 show modified wire engaging members particularly adapted for testing soft copper wire which is easily crimped, dented, or cut. In this modification of the device blocks 96 are held in the hooked portions of the hook members 6. These blocks may be soldered or riveted in position. Each block has a groove 97 cut therein to hold the wire. This groove is curved up slightly at the end remote from spring 20 to prevent a sharp edge contacting with the wire at that end. The remainder of the groove is made in a regular curve upward toward the position of the apex of spring 20 when said spring is under no compression and plunger 26 is in its highest position. This groove will not present a sharp edge to the wire being tested regardless of its tension and at the same time will present a smooth surface against substantially the whole length of which the wire will lie when being deflected, thereby preventing any sharp bends in the wire.

A shoe 97 is mounted on spring 20 at its apex by means of plate 98 having a recess in which spring 20 fits, and bolts 99 holding the shoe 97 and plate 98 together with spring 20 interposed. Stem 65 of the indicating means in this case abuts against plate 98 rather than spring 20. Shoe 97 is provided with a groove in which the wire being tested lies. The path of this groove is a regular curve made so that when the spring 20 is not under compression and the plunger 26 is at its highest position the ends of the path curve toward the hook members 6. This groove will not present any sharp edges to the wire and at the same time will give a smooth surface against substantially the whole length of which the wire will lie.

The description and drawings have related particularly to a device to be used in testing telephone, telegraph, and power lines, wire braces for chimneys, airplanes and the like.

This same device may be used in determining the resistance to deflection and, as a result, the liveliness of wooden beams, shafts for golf sticks and the like with only obvious modifications in the end hook members to adapt them to engage the different shaped bodies.

The invention claimed is:

1. The combination comprising a beam, a pair of members mounted on said beam for engaging a body to be tested, means for laterally adjusting said members along said beam, a spring carried by said beam between said members and movable relatively to said beam, means for applying force to said spring to deflect the body out of line, and means for indicating the force exerted on said spring to hold the body thus deflected.

2. The combination comprising a beam, a pair of members mounted on said beam for engaging a body to be tested, a substantially elliptical spring carried by said beam between said members and movable relatively to said beam, means for applying force to said spring to deflect the body out of line, and means for indicating the force exerted on said spring to hold the body thus deflected.

3. The combination comprising a beam, a pair of members mounted on said beam for engaging a body to be tested, a plunger carried by said beam between said members and movable relatively to said beam, a spring secured to said plunger, means for moving said plunger relatively to said beam to cause said spring to deflect the body out of line, and means for indicating the force exerted on said spring to hold the body thus deflected.

4. The combination comprising a beam, a pair of members mounted on said beam for engaging a body to be tested, a plunger carried by said beam between said members and movable perpendicularly to said beam, a spring mounted on said plunger, means for moving said plunger perpendicularly to said beam to cause said spring to deflect the body out of line, and means for indicating the force exerted on said spring to hold the body thus deflected.

5. A device of the class described comprising a beam, a pair of members mounted on said beam for engaging a body to be tested, means for laterally adjusting said members along said beam, a plunger carried by said beam between said members and movable perpendicularly to said beam, a spring mounted on said plunger, means for moving said plunger perpendicularly to said beam to cause said spring to deflect the body out of line, and means for indicating the force exerted on said spring to hold the body thus deflected.

6. A device of the class described comprising a beam, a pair of members mounted on said beam for engaging a body to be tested, a plunger carried by said beam between said members and movable perpendicularly to said beam, a substantially elliptical spring mounted on said plunger, means for moving said plunger perpendicularly to said beam to cause said spring to deflect the body out of line, and means for indicating the force exerted on said spring to hold the body thus deflected.

7. A device of the class described comprising a beam, a pair of members mounted on said beam for engaging a body to be tested, a plunger carried by said beam between said members and movable perpendicularly to said beam, a substantially elliptical spring mounted on said plunger, a cam carried by said beam and cooperating with the plunger to move it perpendicularly to said beam to cause the spring to deflect the body out of line, means for actuating said cam, and means for indicating the force exerted on said spring to hold the body thus deflected.

8. A device of the class described comprising a beam, a pair of members mounted on said beam for engaging a body to be tested, means for laterally adjusting said members along said beam, a plunger carried by said beam between said members and movable perpendicularly to said beam, a spring mounted on said plunger, a cam carried by said beam and cooperating with the plunger to move it perpendicularly to said beam to cause the spring to deflect the body out of line, means for yieldingly urging the plunger against the periphery of said cam, a lever for actuating said cam, and means for indicating the force exerted on said spring to hold the body thus deflected.

9. A device of the class described comprising a beam, a pair of members mounted on said beam for engaging a body to be tested, a plunger carried by said beam between said members and movable perpendicularly to said beam, a substantially elliptical spring mounted on said plunger, a cam lever carried by said beam and cooperating with the plunger to move it perpendicularly to said beam to cause the spring to deflect the body out of line, and means for indicating the force exerted on said spring to hold the body thus deflected comprising a casing fixed with relation to the side of the spring adjacent the plunger and movable relatively to the opposite side of said spring, a graduated dial mounted on said casing, a shaft jounaled in said casing, a pointer fixed on one end of the shaft adapted to travel over the dial, a pinion fixed on the other end of the shaft, a gear segment pivotally mounted in said casing and engaging said pinion, a link pivotally connected at one end to said gear segment and at the other end to the casing, a rod pivotally connected to said link intermediately of the ends of said link and adapted to move perpendicularly to the side of the spring remote from the plunger, and means yieldingly urging said rod against said side of the spring remote from the plunger.

10. A device of the class described comprising a beam, a pair of movable members mounted on said beam, a roller mounted at the end of each member remote from said beam for engaging a wire to be tested, resilient deflecting means carried by said beam between said members and movable relatively to said beam, means for applying force to said resilient means to deflect the wire out of line, and means for indicating the force exerted on said resilient means to hold the wire thus deflected.

11. A device of the class described comprising a beam, a pair of members mounted on said beam, said members having a hooked portion at their ends remote from the beam, a roller mounted within the hooked portion of each member for engaging a wire to be tested, resilient deflecting means carried by said beam between said members and movable relatively to said beam, means for applying force to said resilient means to deflect the wire out of line, and means for indicating the force exerted on said resilient means to hold the wire thus deflected.

12. A device of the class described comprising a beam, a pair of members mounted on said beam for engaging a wire to be tested, a spring carried by said beam between said members and movable relatively to said beam, a roller mounted on said spring for engaging the wire, means for applying force to said spring to deflect the wire out of line, and means for indicating the force exerted on said spring to hold the body thus deflected.

13. A device of the class described comprising a beam, a pair of members mounted on said beam, a roller mounted at the end of each member remote from said beam for engaging a wire to be tested, a spring carried by said beam between said members and movable relatively to said beam, a roller mounted on said spring for engaging the wire, means for applying force to said spring to deflect the wire out of line, and means for indicating the force exerted on said spring to hold the body thus deflected.

Signed at New York city, in the county of New York and State of New York, this 27th day of December, A. D. 1929.

GEORGE E. CHATILLON.